US012211478B2

(12) United States Patent
Chang

(10) Patent No.: US 12,211,478 B2
(45) Date of Patent: Jan. 28, 2025

(54) NOISE MASKING APPARATUS AND METHOD

(71) Applicants: HYUNDAI MOTOR COMPANY, Seoul (KR); KIA CORPORATION, Seoul (KR)

(72) Inventor: Kyoung Jin Chang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 226 days.

(21) Appl. No.: 18/104,696

(22) Filed: Feb. 1, 2023

(65) Prior Publication Data

US 2024/0029700 A1 Jan. 25, 2024

(30) Foreign Application Priority Data

Jul. 25, 2022 (KR) ........................ 10-2022-0091865

(51) Int. Cl.
*G10K 11/175* (2006.01)
*G10K 11/178* (2006.01)

(52) U.S. Cl.
CPC .... *G10K 11/1752* (2020.05); *G10K 11/17853* (2018.01)

(58) Field of Classification Search
CPC ........................ G10K 11/1752; G10K 11/1754
See application file for complete search history.

(56) References Cited

U.S. PATENT DOCUMENTS

2023/0410776 A1 12/2023 Chang

FOREIGN PATENT DOCUMENTS

| | | | | |
|---|---|---|---|---|
| JP | 2756115 | B2 | | 5/1998 |
| KR | 101333163 | B1 | | 12/2013 |
| KR | 102246623 | B1 | | 4/2021 |
| KR | 102373877 | B1 | | 3/2022 |
| KR | 20230172818 | A | | 12/2023 |
| KR | 20240089343 | A | * | 6/2024 |

OTHER PUBLICATIONS

Wikipedia, Granular synthesis, https://en.wikipedia.org/wiki/Granular_synthesis; Accessed on Jan. 26, 2023; 4 pp.

* cited by examiner

*Primary Examiner* — Kile O Blair
(74) *Attorney, Agent, or Firm* — Lempia Summerfield Katz LLC

(57) ABSTRACT

A noise masking apparatus and method are disclosed. The noise masking apparatus includes a receiver that receives an impact sound and a controller. The controller generates a seed sound source based on an impact noise when the received impact sound is determined as the impact noise, modulates the seed sound source to generate and reproduce a masking sound, sets a repeating reproduction time of the masking sound and a total reproduction time of the masking sound, and reproduces the masking sound during the repeating reproduction time and the total reproduction time.

16 Claims, 13 Drawing Sheets

NOISE MASKING APPARATUS AND METHOD

CROSS-REFERENCE TO RELATED APPLICATION

This application claims the benefit of priority to Korean Patent Application No. 10-2022-0091865, filed in the Korean Intellectual Property Office on Jul. 25, 2022, the entire contents of which are incorporated herein by reference.

TECHNICAL FIELD

The present disclosure relates to a noise masking apparatus and method.

BACKGROUND

In order to reduce the noise generated in daily life, a sound absorbing material or a sound insulating material that fundamentally blocks the transmission path of a noise source may be added to a noise source, or a logic may be applied to offset the noise. However, the above-described techniques increase the cost (e.g., of the noise source, of a system or apparatus including the noise source. In particular, even when the sound absorbing or insulating material or the logic is applied to various types of impact noises generated in various environments such as a vehicle interior, a work space, an office space, a residential space, and the like, the effect of reducing noise is insufficient. Accordingly, there is a need to develop a technology capable of masking (offsetting) various impact sounds.

SUMMARY

Accordingly, it is desirable to develop a technology capable of masking (offsetting) various impact sounds. The present disclosure has been made to solve the above-mentioned problems occurring in the prior art while maintaining intact advantages achieved by the prior art.

An aspect of the present disclosure provides a noise masking apparatus and method capable of generating a masking sound for reducing impact noise when various types of impact noises are generated.

The technical problems to be solved by the present disclosure are not limited to the aforementioned problems. Any other technical problems solved by the present disclosure not mentioned herein should be clearly understood from the following description by those of ordinary skill in the art to which the present disclosure pertains.

According to an aspect of the present disclosure, a noise masking apparatus includes a receiver that receives an impact sound and a controller. The controller generates a seed sound source based on an impact noise when the received impact sound is determined as the impact noise, modulates the seed sound source to generate and reproduce a masking sound, sets a repeating reproduction time of the masking sound and a total reproduction time of the masking sound, and reproduces the masking sound during the repeating reproduction time and the total reproduction time.

The controller may calculate a one-time duration and a generation period of the impact noise, select a base sound source to interwork with the impact noise, and generate the seed sound source by linking the selected base sound source with impact noise data corresponding to the one-time duration.

The controller may set a reproduction time of the seed sound source corresponding to the one-time duration.

The controller may set a pitch change rate of the seed sound source by using a sigmoid function.

The controller may apply at least one of a low-pass filter, a high-pass filter, and a band-pass filter to exclude a specific frequency band from the seed sound source.

The controller may set a one-time reproduction time of the masking sound to be longer than a reproduction time of the seed sound source.

The controller may set the repeating reproduction time of the masking sound to be longer than the one-time reproduction time of the masking sound.

The controller may set the total reproduction time of the masking sound to be longer than the repeating reproduction time of the masking sound.

According to another aspect of the present disclosure, a noise masking method includes: receiving an impact sound; generating a seed sound source based on an impact noise when the received impact sound is determined as the impact noise; modulating the seed sound source to generate a masking sound; reproducing the masking sound; setting a repeating reproduction time of the masking sound and reproducing the masking sound during the repeating reproduction time; and setting a total reproduction time of the masking sound and reproducing the masking sound during the total reproduction time.

The generating of the seed sound source may include calculating a one-time duration and a generation period of the impact noise, selecting a base sound source to interwork with the impact noise, and generating the seed sound source by linking the selected base sound source with impact noise data corresponding to the one-time duration.

A reproduction time of the seed sound source may be set corresponding to the one-time duration.

The generating of the masking sound may include setting a pitch change rate of the seed sound source by using a sigmoid function.

The generating of the masking sound may include applying at least one of a low-pass filter, a high-pass filter, and a band-pass filter to exclude a specific frequency band from the seed sound source.

The generating of the masking sound may include setting a one-time reproduction time of the masking sound to be longer than a reproduction time of the seed sound source.

The repeating reproduction time of the masking sound may be set to be longer than the one-time reproduction time of the masking sound The total reproduction time of the masking sound may be set to be longer than the repeating reproduction time of the masking sound.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
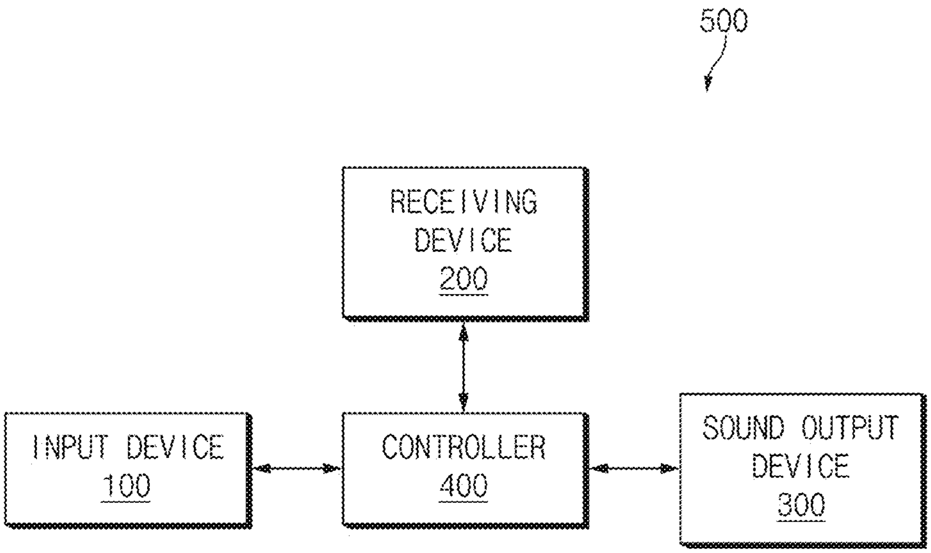
FIG. 1 is a diagram illustrating the configuration of a noise masking apparatus according to an embodiment of the present disclosure.

Hereinafter, some embodiments of the present disclosure are described in detail with reference to the accompanying drawings. In adding the reference numerals to the components of each drawing, it should be noted that the identical or equivalent components are designated by an identical numeral even when the components are displayed on different drawings. Further, in describing an embodiment of the present disclosure, a detailed description of a related known configuration or function has been omitted when it is determined that a description thereof would interfere with the understanding of the embodiment of the present disclosure.

In describing the components of an embodiment according to the present disclosure, terms such as first, second, A, B, (a), (b), and the like may be used. These terms are merely intended to distinguish the components from other components. The terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or perform that operation or function.

The present disclosure relates to a noise masking apparatus, which is provided in a place where a noise such as a repetitive impact sound is generated. The noise masking apparatus synthesizes and outputs a sound source to mask the noise. Additionally, the present disclosure relates to a method of masking a noise.

FIG. 1 is a diagram illustrating the configuration of a noise masking apparatus according to an embodiment of the present disclosure.

As shown in FIG. 1, a noise masking apparatus 500 may include an input device 100, a receiving device 200, a sound output device 300, and a controller 400.

The input device 100 may receive an input corresponding to a user's manipulation, operation, or voice. In this case, an input of a user may include an input for operating the noise masking apparatus 500. According to an embodiment, the input device 100 may include a touch input device or a mechanical input device.

The receiving device 200 may receive or detect an impact sound. In this case, the impact sound may include a mechanical impact sound, a high-frequency sound of a vehicle generated at regular intervals, and inter-floor noise or noise traveling through a floor such as footsteps, hammer sounds, and the like. The receiving device 200 may include a microphone that can easily receive or detect the impact sound.

The sound output device 300 may output a masking sound generated by the controller 400.

The controller 400 may be implemented with various processing devices such as a microprocessor and the like in which a semiconductor chip capable of performing operations or executions of various commands is built-in. The controller 400 may control operations of a noise masking apparatus according to an embodiment of the present disclosure. The details of controlling the noise masking apparatus are described with reference to FIGS. 2-9.

Figure 2:
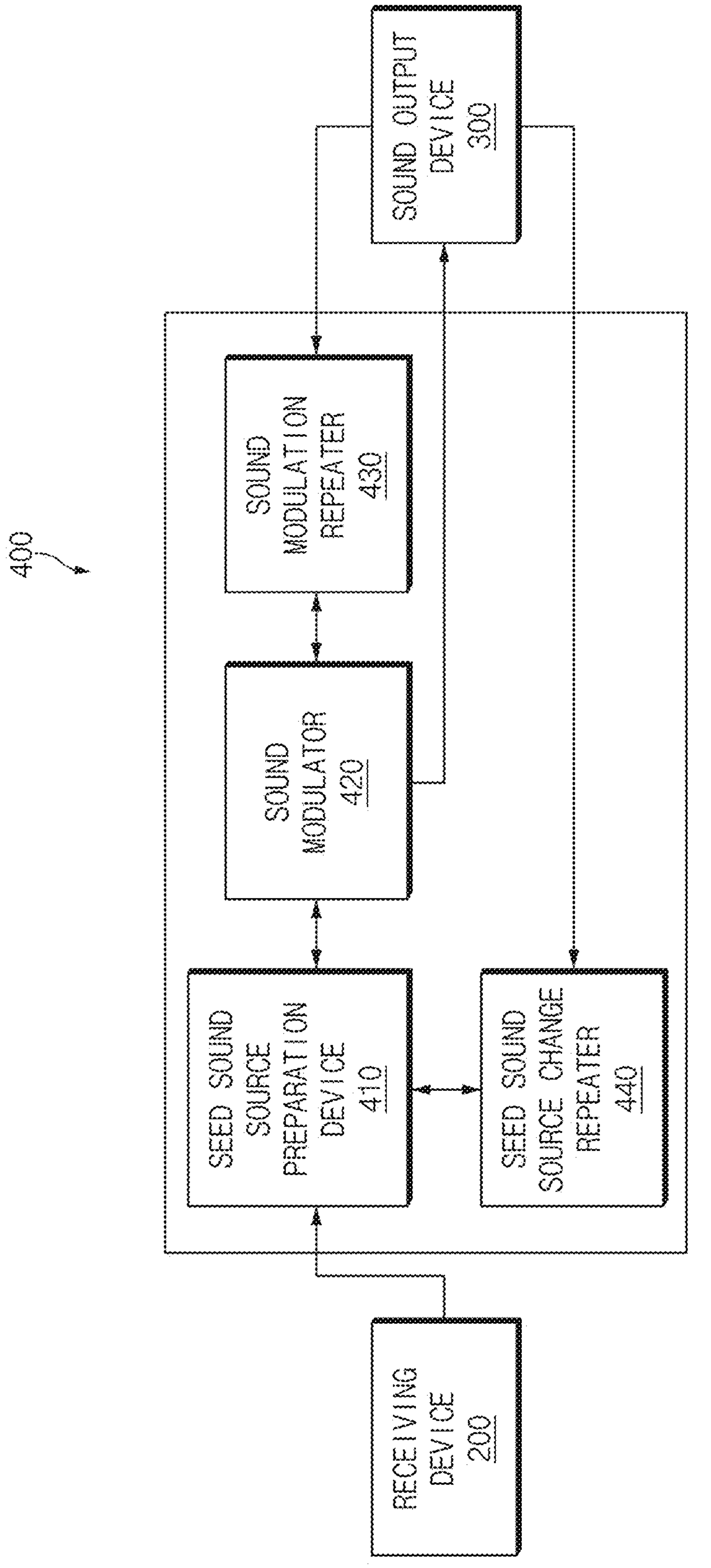
FIG. 2 is a diagram illustrating the configuration of a controller according to an embodiment of the present disclosure.

FIG. 2 is a diagram illustrating the configuration of a controller according to an embodiment of the present disclosure.

As shown in FIG. 2, the controller 400 includes a seed sound source preparation device 410, a sound modulator 420, a sound modulation repeater 430, and a seed sound source change repeater 440.

In a case where the controller 400 receives an input for operating or turning on a noise masking apparatus by a user, when the magnitude of an impact sound received through the receiving device 200 is equal to or greater than a first threshold value, and the amplitude change rate of the impact sound is equal to or greater than a second threshold value, the controller 400 may determine that the impact sound is an impact noise. In addition, the controller 400 may generate a seed sound source for masking an impact noise. First, the seed sound source preparation device 410 for generating a seed sound source is described with reference to FIGS. 3-5.

Figure 3:
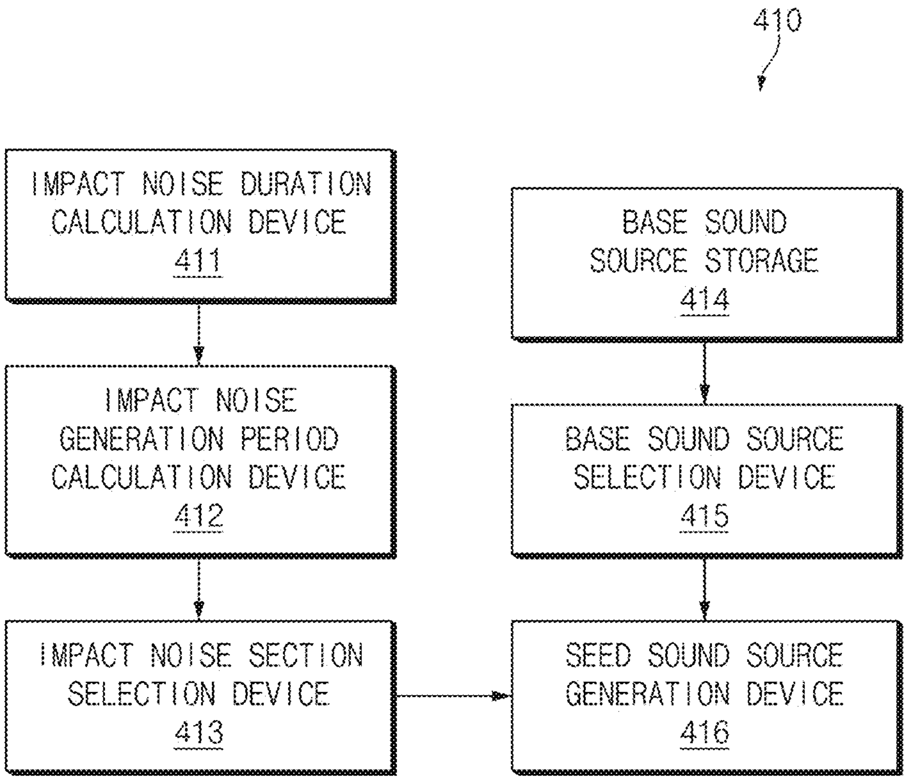
FIG. 3 is a diagram illustrating the configuration of a seed sound source preparation device according to an embodiment of the present disclosure.
Figure 4:
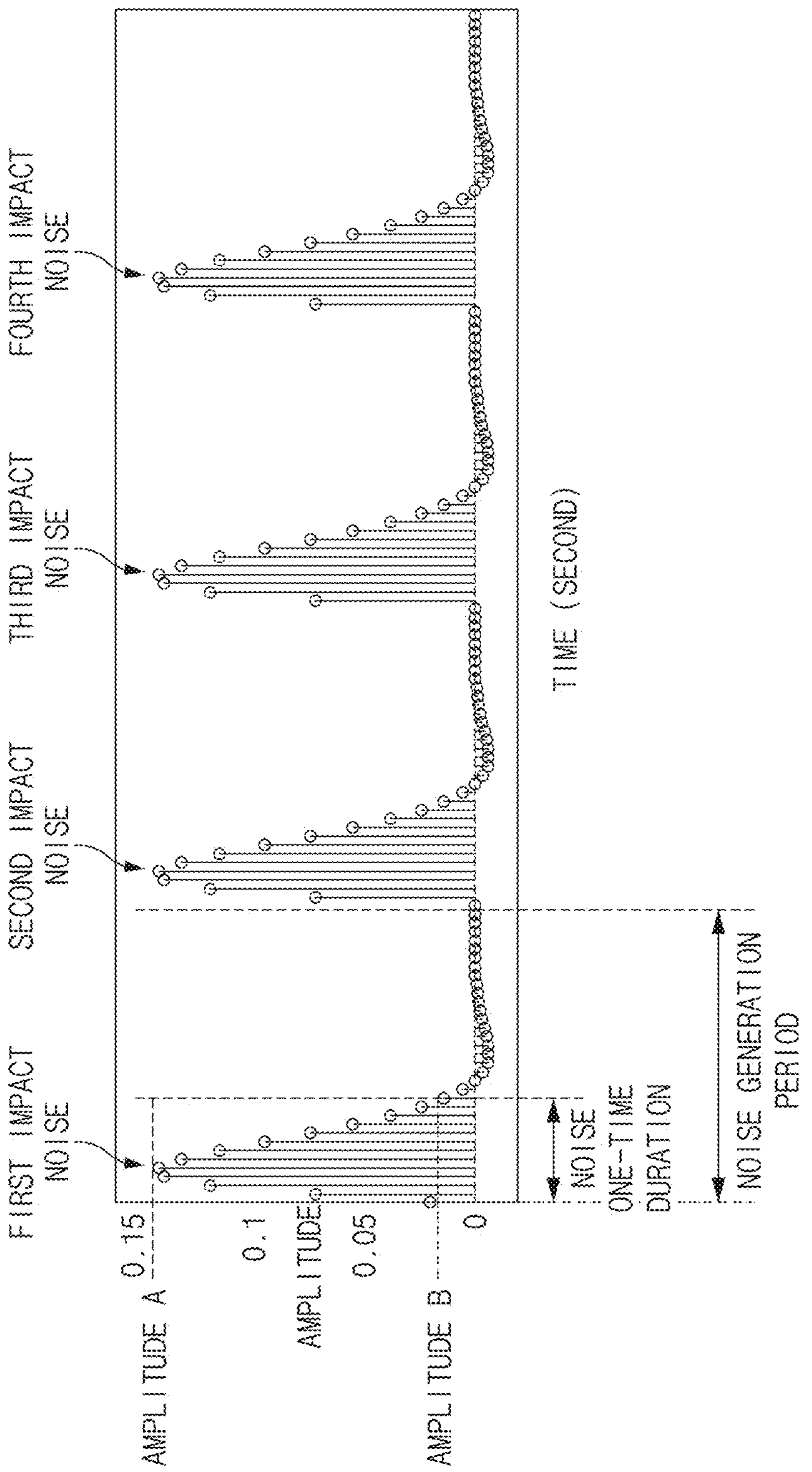
FIG. 4 is a graph illustrating an amplitude change corresponding to the generation time of an impact noise according to an embodiment of the present disclosure.
Figure 5:
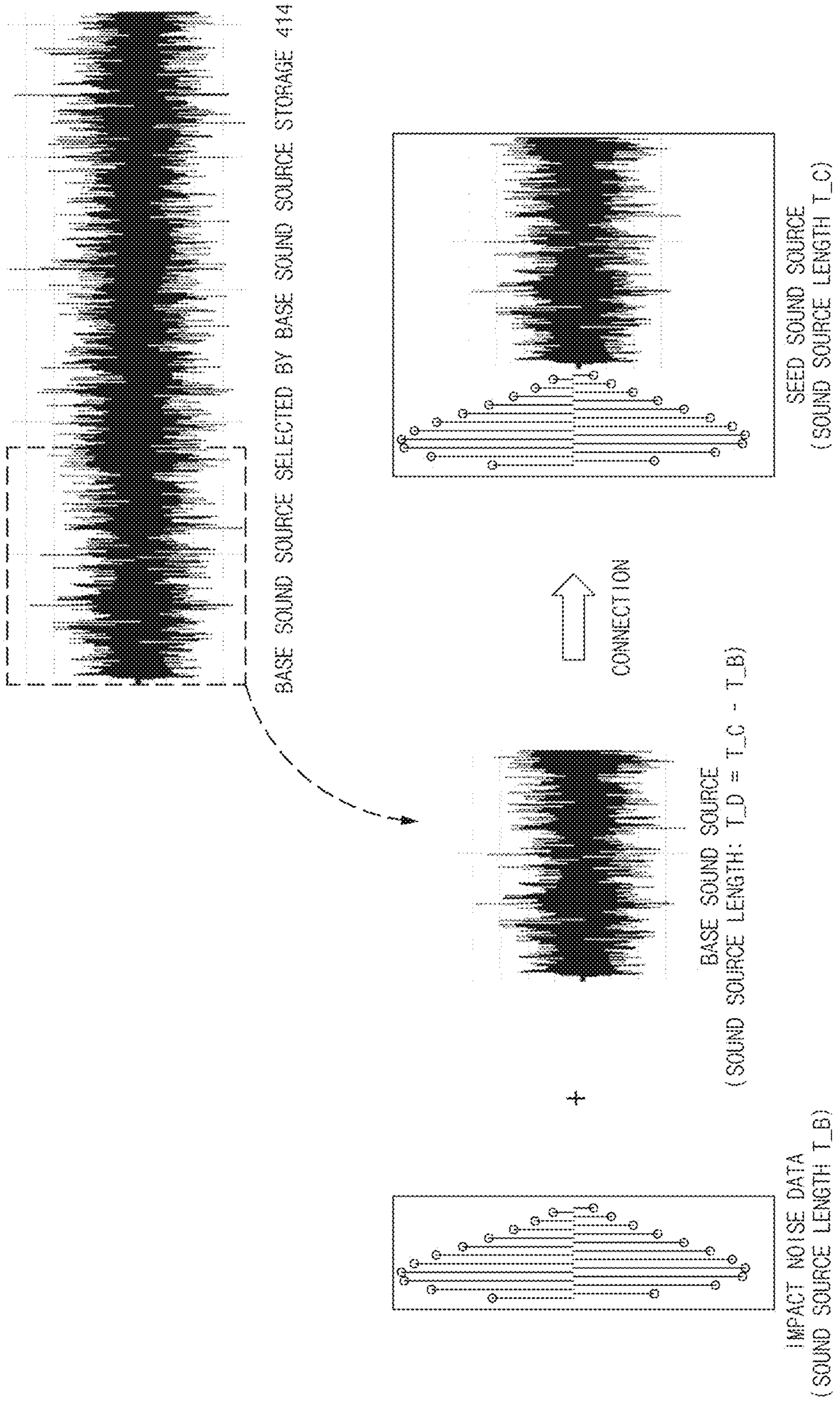
FIG. 5 is a graph schematically illustrating a scheme of generating a seed sound source generated according to an embodiment of the present disclosure.

FIG. 3 is a diagram illustrating the configuration of a seed sound source preparation device according to an embodiment of the present disclosure. FIG. 4 is a graph illustrating an amplitude change corresponding to the generation time of an impact noise according to an embodiment of the present disclosure. FIG. 5 is a graph schematically illustrating a scheme of generating a seed sound source generated according to an embodiment of the present disclosure.

As shown in FIG. 3, the seed sound source preparation device 410 may include an impact noise duration calculation device 411, an impact noise generation period calculation device 412, an impact noise section selection device 413, a base sound source storage 414, a base sound source selection device 415, and a seed sound source generation device 416.

The impact noise duration calculation device 411 may calculate a one-time duration $T_b$ of an impact noise.

The impact noise generation period calculation device 412 may calculate an impact noise generation period T_a.

When the impact noise is repeatedly generated, the generation period and the one-time duration may be changed. In this case, the impact noise duration calculation device 411 may calculate the average value of the measured data as the one-time duration T_b of the impact noise. The impact noise generation period calculation device 412 may calculate an average value of the measured data as the impact noise generation period T_a. For a more detailed description, refer to FIG. 4.

As shown in FIG. 4, when the first impact noise starts, the impact noise duration calculation device 411 may determine the time until the time point (e.g., amplitude B) when the amplitude (amplitude A) of the maximum peak of the first impact noise decreases to a specified % (e.g., 5%) of the amplitude of the maximum peak or less as the one-time duration. In addition, the impact noise duration calculation device 411 may repeatedly calculate the one-time duration in the above-described manner and calculate the average value, thereby calculating the one-time duration T_b of the impact noise.

The impact noise generation period calculation device 412 may determine the time from the time when the first impact noise starts to the time when the second impact noise starts as the noise generation period. In addition, the impact noise generation period calculation device 412 may calculate the impact noise generation period T_a by repeatedly calculating the noise generation period in the above-described manner and calculating the average value.

As shown in FIG. 4, the impact noise section selection device 413 may select a section in which the impact noise continues once from among the sections in which the impact noise occurs.

The base sound source storage 414 may store a base sound source capable of masking the impact noise. According to an embodiment, the base sound source may include a sound effect and, for example, may include natural sound sources such as a flowing water sound, a birdsong sound, a wind sound, and the like, or may include sound sources such as musical instrument sounds, electronic sounds, and the like.

The base sound source selection device 415 may set a length T_c of the seed sound source, select the base sound source used for masking the impact noise from the base sound source storage 414, and set length T_d of the base sound source. In this case, the length T_c of the seed sound source may mean the time for which the seed sound source is reproduced, and the length T_d of the base sound source may mean the time for which the base sound source is reproduced.

The base sound source selection device 415 may set the length T_d of the base sound source by using Equation 1.

$$\text{Length } T\_d \text{ of base sound source} = \text{Length } T\_c \text{ of seed sound source} - \text{One-time duration } T\_b \text{ of impact noise} \quad \text{<Equation 1>}$$

The base sound source selection device 415 may set the length T_c of the seed sound source to be equal to the impact noise generation period T_a such that a section in which the impact noise is not generated is filled with the base sound source. When the impact noise generation period T_a is very short or long, the base sound source selection device 415 may set the length T_c of the seed sound source to be at least twice the one-time duration T_b of the impact noise and to be longer than the length T_d of the base sound source. When the base sound source selection device 415 sets the length T_c of the seed sound source, it may set the length T_d of the base sound source to be longer than the one-time duration T_b of the impact noise.

The seed sound source generation device 416 may generate the seed sound source by sequentially connecting (e.g., linking, interworking) the impact noise data selected by the impact noise section selection device 413 and the base sound source selected by the base sound source selection device 415. For a more detailed description, refer to FIG. 5. According to an embodiment of the present disclosure, the seed sound source generated by the seed sound source generation device 416 is a unit sound source of sound synthesis used in the granular synthesis scheme.

As shown in FIG. 5, the seed sound source generation device 416 may generate a seed sound source having a sound source length T_c by connecting the impact noise data having the sound source length T_b and a base sound source having the sound source length T_d.

Figure 6:
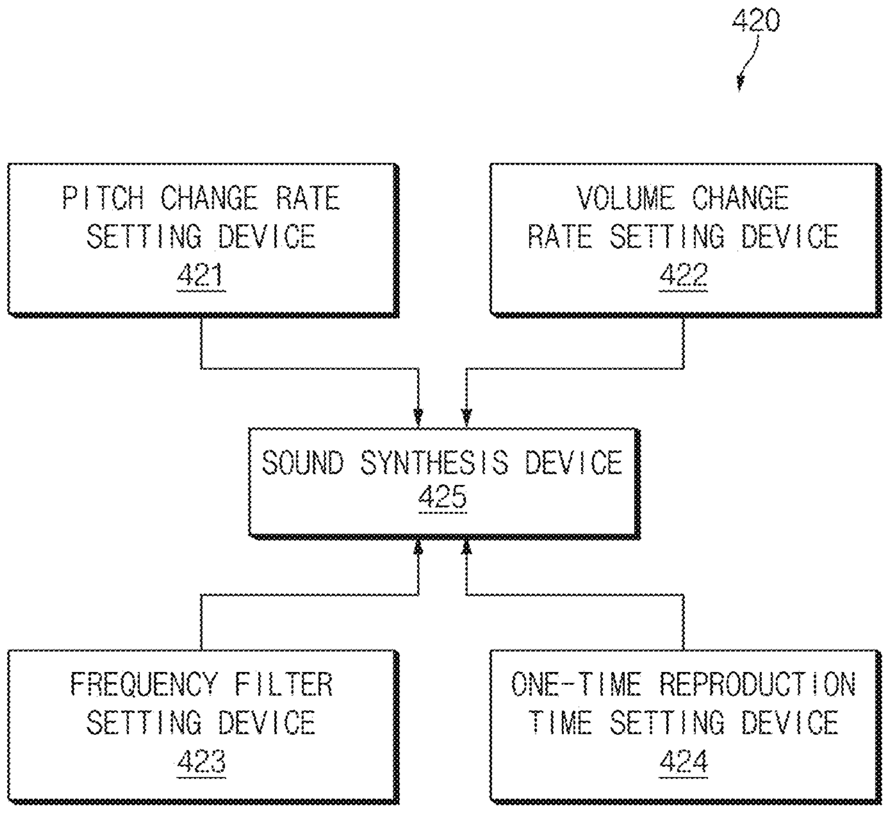
FIG. 6 is a diagram illustrating the configuration of a sound modulation device according to an embodiment of the present disclosure.

FIG. 6 is a diagram illustrating the configuration of a sound modulation device according to an embodiment of the present disclosure.

The sound modulator 420 may include a pitch change rate setting device 421, a volume change rate setting device 422, a frequency filter setting device 423, a one-time reproduction time setting device 424, and a sound synthesis device 425.

The pitch change rate setting device 421 may design the pitch change rate of the seed sound source to be in the form of a function. According to an embodiment, the pitch change rate setting device 421 may be in the form of a sigmoid function because the pitch change rate setting device 421 uses a continuous function. In one example, the pitch change rate setting device 421 may be in a form that converges over time. Accordingly, the pitch change rate setting device 421 may make the seed sound source feel like music.

The volume change rate setting device 422 may arbitrarily set the volume change rate of the seed sound source. According to an embodiment, the volume change rate setting device 422 may be set to repeatedly increase and decrease the volume.

The frequency filter setting device 423 may set the type of frequency filter and a frequency band to be filtered. According to an embodiment, the frequency filter setting device 423 may use a band-stop filter to exclude a specific frequency band, and may use other low-pass filters, high-pass filters, band-pass filters, and the like.

The one-time reproduction time setting device 424 may set a one-time reproduction time T_e of the masking sound. According to an embodiment, the one-time reproduction time setting device 424 may set the masking sound one-time reproduction time longer than the seed sound source length T_c. For example, the one-time reproduction time setting device 424 may set the masking sound one-time reproduction time to 10-20 times the length T_c of the seed sound source.

The sound synthesis device 425 may generate a masking sound by synthesizing a seed sound source by a granular synthesis scheme. According to an embodiment, the sound synthesis device 425 may apply the pitch change rate set in the above-described manner while repeating the seed sound source, may change the volume to the set volume, and may reflect the frequency filtering to generate the masking sound to which the one-time reproduction time is set. For a more detailed description, refer to FIG. 7.

Figure 7:
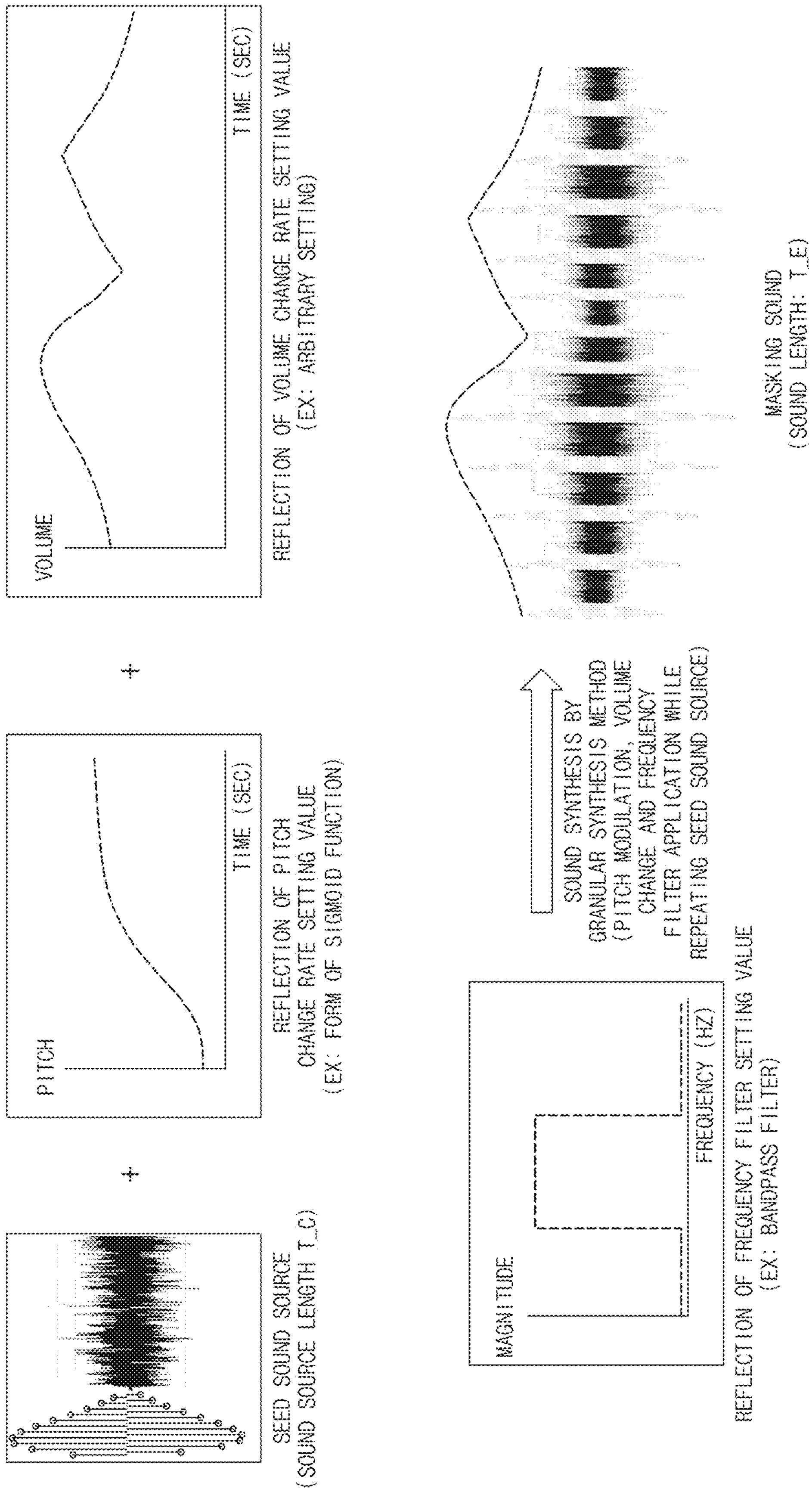
FIG. 7 is a diagram schematically illustrating a scheme of generating a masking sound according to an embodiment of the present disclosure.

FIG. 7 is a diagram schematically illustrating a scheme of generating a masking sound according to an embodiment of the present disclosure.

As shown in FIG. 7, the sound synthesis device 425 may apply the pitch change rate in the form of a sigmoid function to a seed sound source having a sound source length T_c, may apply an arbitrarily set volume change rate, and may apply a specific frequency filtered setting value to synthesize the sounds in a granular synthesis scheme. A masking sound is thereby generated having a sound source length T_e.

When the sound synthesis device 425 generates the masking sound, the sound may be reproduced through the output device 300 for one-time reproduction time T_e.

When the sound is reproduced for one-time reproduction time T_e through the output device 300, the sound modulation repeater 430 may set the repeat reproduction time and may reproduce the masking sound for the repeat reproduction time through the output device 300. For a more detailed description, refer to FIG. 8.

Figure 8:
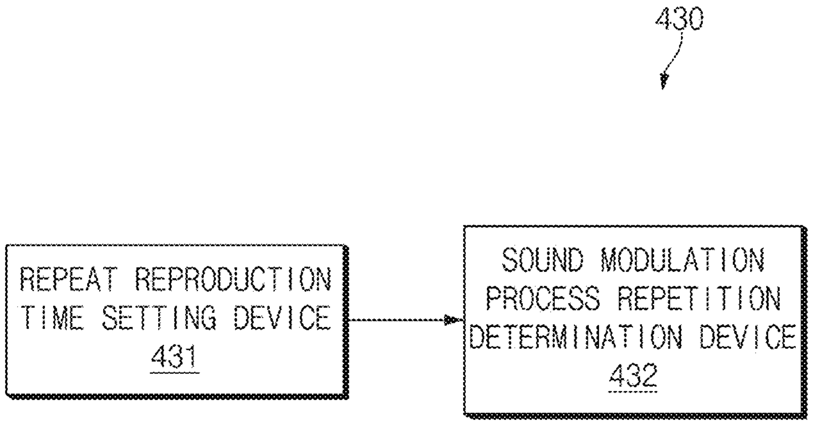
FIG. 8 is a diagram illustrating the configuration of a sound modulation repeater according to an embodiment of the present disclosure.

FIG. 8 is a diagram illustrating the configuration of a sound modulation repeater according to an embodiment of the present disclosure.

As shown in FIG. 8, the sound modulation repeater 430 may include a repeat reproduction time setting device 431 and a sound modulation process repetition determination device 432.

The repeat reproduction time setting device 431 may set a repeat reproduction time T_f and reproduce the masking sound through the output device 300 during the repeat reproduction time T_f. According to an embodiment, the repeat reproduction time setting device 431 may set the repeat reproduction time T_f to several times the one-time reproduction time T_e of the masking sound.

The sound modulation process repetition determination device 432 may determine whether the masking sound is reproduced during the repeat reproduction time T_f. When it is determined that the masking sound is not reproduced for the repeat reproduction time T_f, the sound modulation process repetition determination device 432 may repeat the operation of the sound modulator 420 to generate a plurality of masking sounds (new masking sounds) and allow the plurality of masking sounds to be reproduced for the repeat reproduction time T_f. According to an embodiment, the sound modulation process repetition determination device 432 may select that the sound modulator 420 resets one of the pitch change rate, the volume change rate and the frequency filtering of the seed sound source during the repeat reproduction time T_f and generate a plurality of masking sounds (new masking sounds (masking sounds having different tones)).

For example, when the repeat reproduction time T_f is 9 seconds and the one-time reproduction time T_e of the masking sound is set to 3 seconds, three masking sounds may be reproduced for the repeat reproduction time T_f. The sound modulation process repetition determination device 432 may generate three masking sounds by applying the same variable when the user desires the same sound every time the masking sound is reproduced within the repeat reproduction time T_f. The sound modulation process repetition determination device 432 may generate three masking sounds by setting different variables (that can be set by the user) when the user desires different sounds every time the masking sound is reproduced within the repeat reproduction time T_f.

For example, when it is determined to reset the pitch change rate, the sound modulation process repetition determination device 432 may generate the first sound (the first masking sound) including a masking sound generated by the sound synthesis device 425, the second sound (the second masking sound) including a masking sound in which the pitch change rate is increased to 'A' in the first masking sound, and the third sound (the third masking sound) including a masking sound in which the pitch change rate is increased to 'B' which is larger than 'A' in the first masking sound. Thus, the pitch is rapidly increased with each playback.

As another example, when it is determined to reset the frequency filtering, the sound modulation process repetition determination device 432 may generate the first sound (the first masking sound) including a masking sound generated by the sound synthesis device 425 by allowing a filter having a different frequency band to be automatically selected every time the sound is reproduced, the second sound (the second masking sound) including a masking sound obtained by passing only low frequencies of the first masking sound, and the third sound (the third masking sound) including a masking sound obtained by passing only high frequencies of the first masking sound. Thus, a sound of a different frequency is reproduced every time the masking sound is reproduced.

When the sound modulation process repetition determination device 432 determines that the reproduction of the masking sound during the repeat reproduction time T_f is completed, the seed sound source change repeater 440 may set the total reproduction time of the masking sound.

Figure 9:
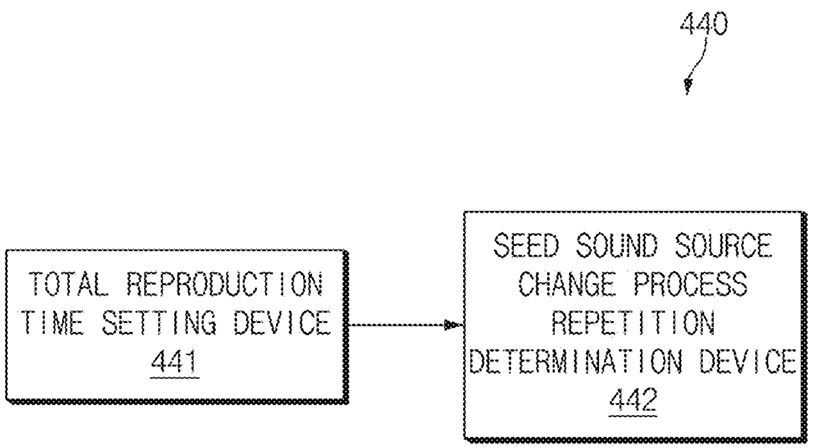
FIG. 9 is a diagram illustrating the configuration of a seed sound source change repeater according to an embodiment of the present disclosure.

FIG. 9 is a diagram illustrating the configuration of a seed sound source change repeater according to an embodiment of the present disclosure.

As shown in FIG. 9, the seed sound source change repeater 440 may include a total reproduction time setting device 441 and a seed sound source change process repetition determination device 442.

The total reproduction time setting device 441 may set a total reproduction time T_g of the masking sound and reproduce the masking sound through the output device 300 during the total reproduction time T_g. According to an embodiment, the total reproduction time setting device 441 may set the total reproduction time T_g to several times the repeat reproduction time T_f. The total reproduction time setting device 441 may set the duration of the impact noise as the total reproduction time T_g of the masking sound.

The seed sound source change process repetition determination device 442 may determine whether the masking sound is reproduced during the total reproduction time T_g of the masking sound. When the seed sound source change process repetition determination device 442 determines that the masking sound is not reproduced for the total reproduction time T_g of the masking sound, the operations of the seed sound source preparation device 410 and the sound modulator 420 may be repeated to mask the impact noise for the total reproduction time T_g. According to an embodiment, during the total reproduction time T_g, the seed sound source preparation device 410 may change the base sound source included in the seed sound source or change the length of the seed sound source. The final masking sound (a masking sound of a different tone) is thereby generated. A base sound source stored in the base sound source storage 414 may be used or the user may select the sound source. In addition, during the total reproduction time T_g, the sound modulator 420 may set the pitch change rate, volume change rate, and frequency filtering of the seed sound source a second or multiple times to generate the final or a subsequent masking sound (a masking sound of a different tone).

For example, when the total reproduction time T_g is 27 seconds and the repeat reproduction time T_f is set to 9 seconds, three new or different masking sounds may be reproduced during the total reproduction time T_g. The seed sound source change process repetition determination device 442 may generate the final masking sound by applying the same variable when the same sound is desired every time a new masking sound is reproduced during the total reproduction time T_g. When a different sound is desired every time a new masking sound is reproduced during the total reproduction time T_g, the seed sound source change process repetition determination device 442 may set a different variable (settable by the user) to generate the final masking sound.

For example, when it is determined to reset the pitch change rate, the seed sound source change process repetition determination device 442 may generate the final masking sound. The final masking sound may include a new masking sound generated by resetting the pitch change rate as a first sound (first new masking sound), a new masking sound generated by resetting frequency filtering as a second sound (second new masking sound), and a new masking sound generated by resetting the base sound source as a third sound (third new masking sound).

The seed sound source change process repetition determination device 442 may end the operation of the noise masking apparatus when the masking sound is reproduced during the total reproduction time T_g of the masking sound.

Figure 10:
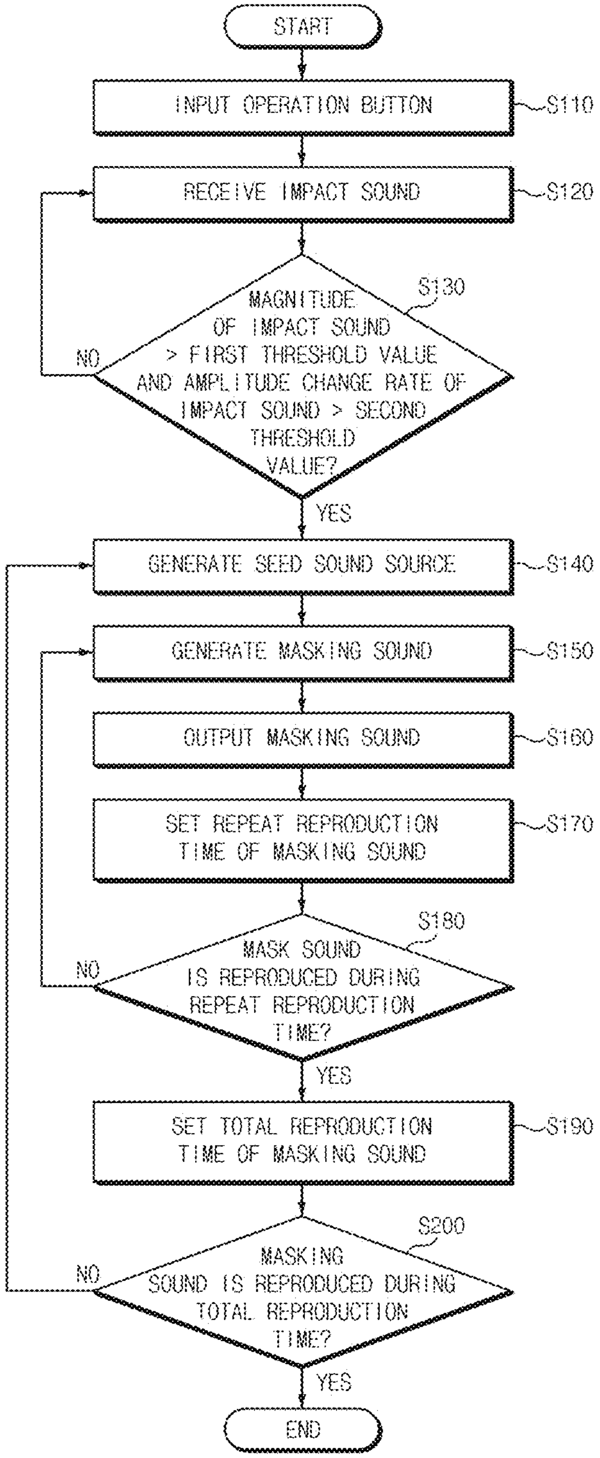
FIG. 10 is a flowchart illustrating a noise masking method according to an embodiment of the present disclosure.

FIG. 10 is a flowchart illustrating a noise masking method according to an embodiment of the present disclosure.

As shown in FIG. 10, in S110, the controller 400 may receive an input for operating a noise masking apparatus by the user.

In S120, the controller 400 may receive the impact sound received through the receiving device 200.

In S130, the controller 400 may determine whether the magnitude of the received impact sound is equal to or greater than a first threshold value and the amplitude change rate of the impact sound is equal to or greater than a second threshold value. When the magnitude of the received impact sound is greater than or equal to the first threshold value and the amplitude change rate of the impact sound is greater than or equal to the second threshold value in S130, the controller 400 may determine the received impact sound as impact noise.

In addition, the controller 400 may generate a seed sound source for masking the impact noise in S140. For a more detailed description of S140, refer to FIG. 11.

When a seed sound source is generated, the controller 400 may generate a masking sound based on the seed sound source in S150. For a more detailed description of S150, refer to FIG. 12.

When the masking sound is generated, the controller 400 may output the sound through the output device 300 during the one-time reproduction time T_e in S160.

In S170, the controller 400 may set a repeat reproduction time.

In S180, the controller 400 may determine whether the masking sound is reproduced during the repeat reproduction time.

The controller 400 may perform S150-S180 during the repeat reproduction time T_f when it is determined in S180 that the masking sound is not reproduced during the repeat reproduction time (No).

When it is determined in S180 that the masking sound is reproduced during the repeat reproduction time T_f (Yes), the controller 400 may set the total reproduction time of the masking sound in S190.

In S200, the controller 400 may determine whether the masking sound is reproduced for the total reproduction time.

When it is determined in S200 that the masking sound is not reproduced during the total reproduction time T_g of the masking sound (No), and the controller 400 may perform operations S140-S190.

When it is determined in S200 that the masking sound is reproduced during the total repeat reproduction time T_f (Yes), the controller 400 may end the operation of the noise masking apparatus.

Figure 11:
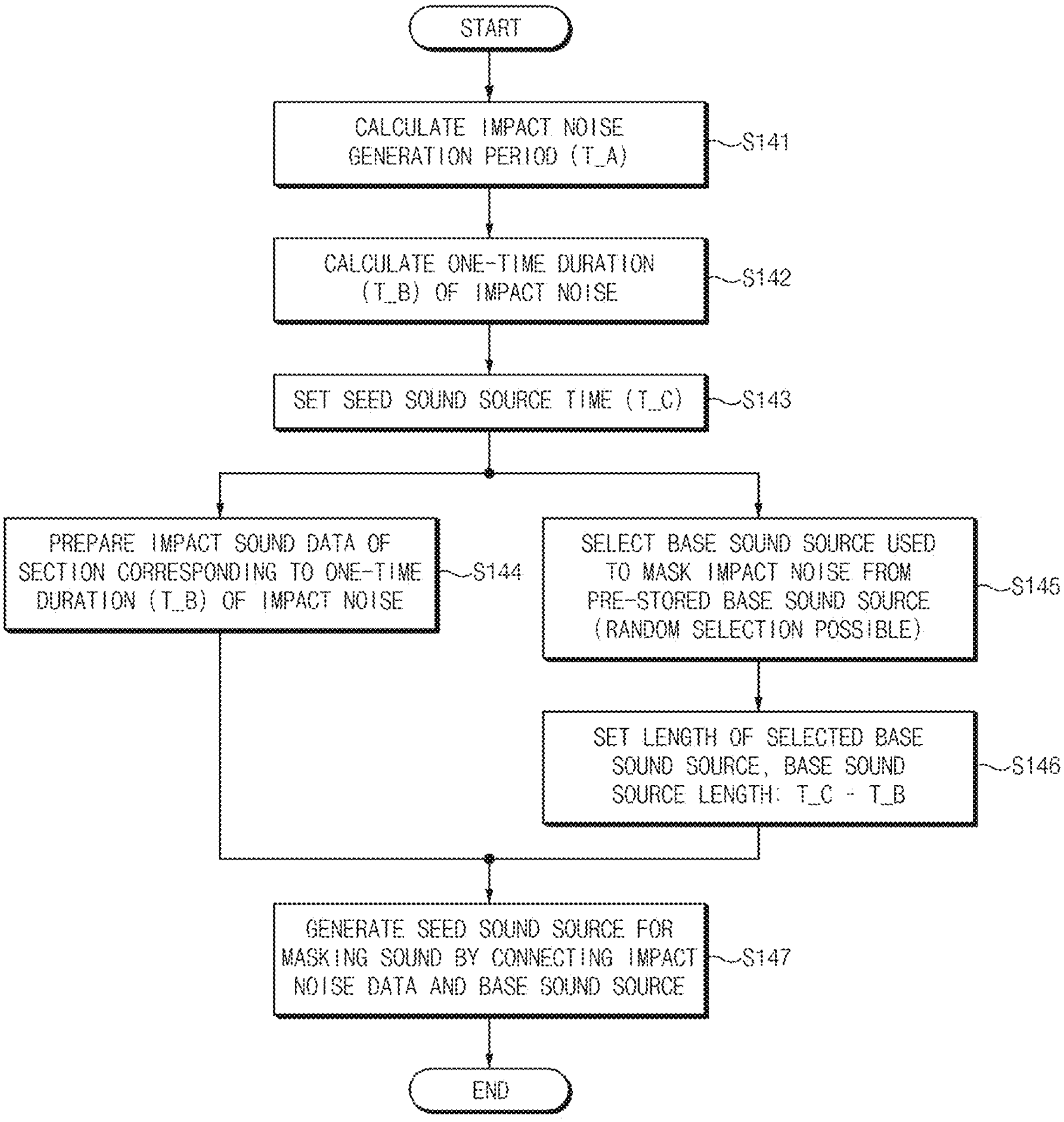
FIG. 11 is a flowchart illustrating a method of generating a seed sound source according to an embodiment of the present disclosure.

FIG. 11 is a flowchart illustrating a method of generating a seed sound source according to an embodiment of the present disclosure. The operations of FIG. 11 may be performed by the seed sound source preparation device 410 included in the controller 400 according to an embodiment of the present disclosure.

As shown in FIG. 11, the controller 400 may calculate the generation period T_a of the impact noise in S141. In addition, the impact noise duration calculation device 411 of the controller 400 may calculate the one-time duration T_b of the impact noise in S142.

In S143, the controller 400 may calculate the seed sound source time T_c.

In S144, the controller 400 may select a continuous section including the one-time duration of the impact noise from among the sections in which the impact noise is generated.

In S145, the controller 400 may select a base sound source used to mask the impact noise from a pre-stored base sound source.

In S146, the controller 400 may set the length T_d of the base sound source. According to an embodiment, the length T_d of the base sound source may be set using Equation 1.

In S147, the controller 400 may generate the seed sound source by sequentially connecting the impact noise data selected in S144 and the base sound source selected in S145.

Figure 12:
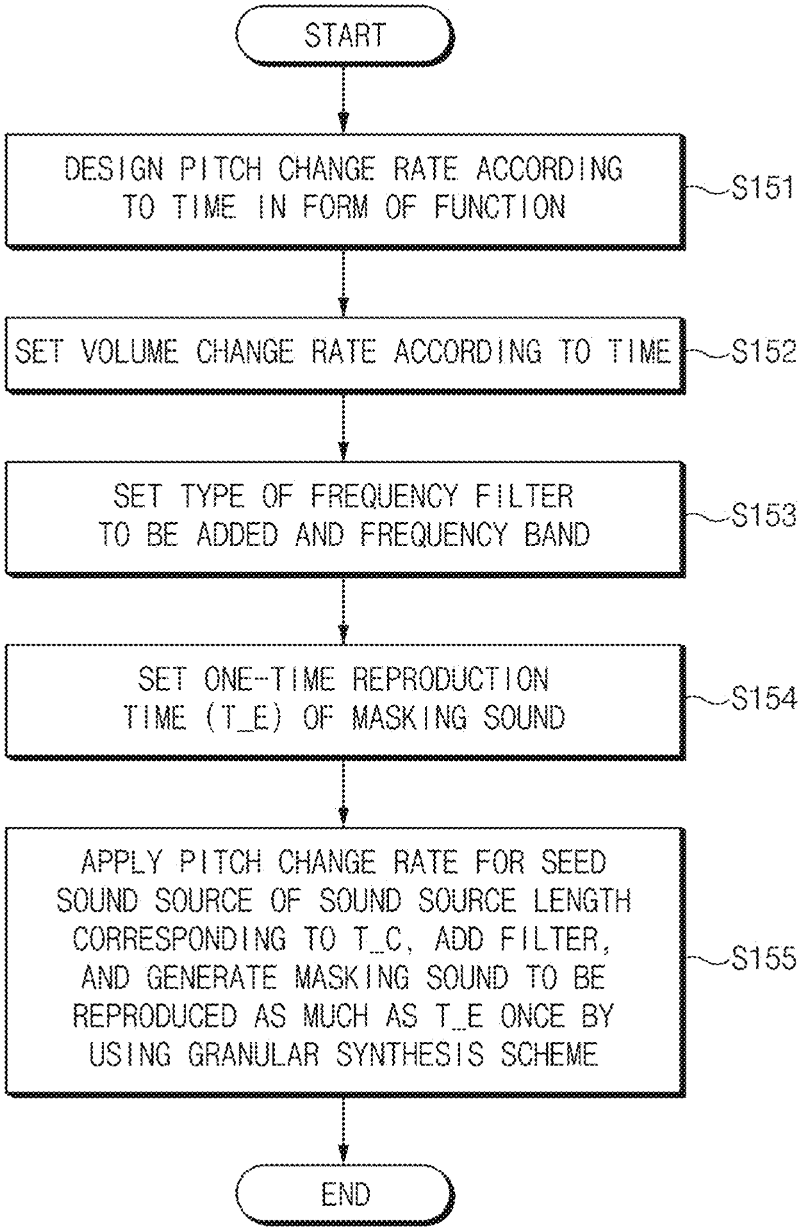
FIG. 12 is a flowchart illustrating a method for generating a masking sound according to an embodiment of the present disclosure.

FIG. 12 is a flowchart illustrating a method for generating a masking sound according to an embodiment of the present disclosure. The operations of FIG. 12 may be performed by the sound modulator 420 included in the controller 400 according to an embodiment of the present disclosure.

As shown in FIG. 12, in S151, the controller 400 may design the pitch change rate of the seed sound source according to or over time in the form of a function. According to an embodiment, the controller 400 may design the pitch change rate in the form of a sigmoid function.

The controller 400 may arbitrarily set the volume change rate of the seed sound source. According to an embodiment, the controller 400 may set the volume to repeatedly increase and decrease.

In S153, the controller 400 may set a type of frequency filter and a frequency band to be filtered. According to an embodiment, the controller 400 may use a band-stop filter to exclude a specific frequency band, and may use other low-pass filters, high-pass filters, band-pass filters, and the like.

In S154, the controller 400 may set the one-time reproduction time T_e of the masking sound. According to an embodiment, the one-time reproduction time setting device 424 may set the one-time reproduction of the masking sound to be longer than the seed sound source length T_c. For example, the one-time reproduction time setting device 424 may set the one-time reproduction time of the masking sound to 10-20 times the seed sound source length T_c.

In S155, the controller 400 may generate the masking sound by synthesizing the seed sound source in a granular synthesis scheme. While repeating the seed sound source, the controller 400 may apply the pitch change rate set in the above-described manner, change the volume to the set volume, and apply the frequency filtering. The masking sound is thereby generated for which the one-time reproduction time is set.

Figure 13:
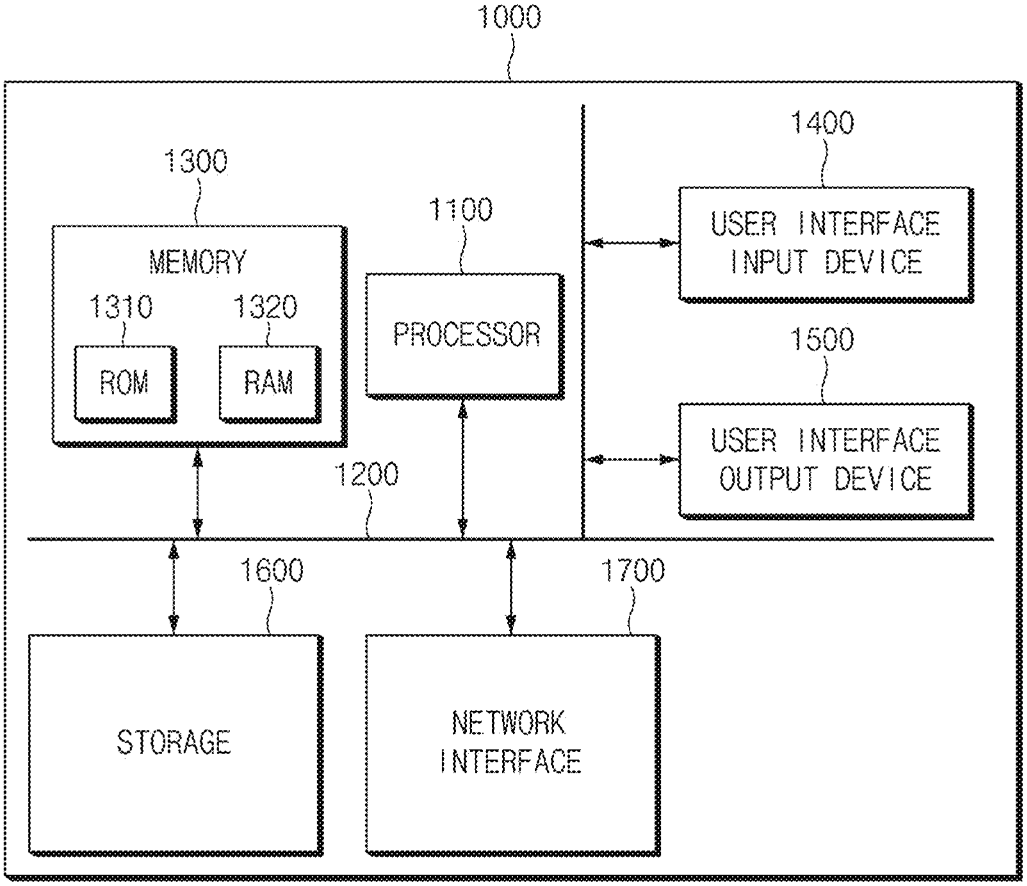
FIG. 13 is a diagram illustrating a computing system for executing a method according to an embodiment of the present disclosure.

FIG. 13 is a diagram illustrating a computing system for executing a method according to an embodiment of the present disclosure.

Referring to FIG. 13, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (i.e., the memory 1300 and/or the storage 1600), such as a RAM, a flash memory, a ROM, an EPROM, an EEPROM, a register, a hard disk, solid state drive (SSD), a detachable disk, or a CD-ROM. The storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, the noise masking apparatus and method may generate the masking sound capable of reducing various types of impact noise, so that it is possible to reduce stress or inconvenience caused by impact noises and improve user satisfaction.

Although embodiments of the present disclosure have been described for illustrative purposes, those of ordinary skill in the art should appreciate that various modifications, additions and substitutions are possible without departing from the scope and spirit of the disclosure.

Therefore, the embodiments disclosed and described in the present disclosure are provided for the sake of description, not for limiting the technical concepts of the present disclosure. It should be understood that such embodiments are not intended to limit the scope of the technical concepts of the present disclosure. The scope of protection of the present disclosure should be understood or interpreted by the claims below. All of the technical concepts within the scope equivalent to that of the present disclosure should be interpreted to be within the scope of the rights of the present disclosure.

What is claimed is:

1. A noise masking apparatus comprising:

a receiver configured to receive an impact sound; and a controller configured to generate a seed sound source based on an impact noise when the received impact sound is determined as the impact noise, modulate the seed sound source to generate and reproduce a masking sound, set a repeating reproduction time of the masking sound and a total reproduction time of the masking sound, and reproduce the masking sound during the repeating reproduction time and the total reproduction time.

2. The noise masking apparatus of claim 1, wherein the controller is configured to calculate a one-time duration and a generation period of the impact noise, select a base sound source to interwork with the impact noise, and generate the seed sound source by linking the selected base sound source with impact noise data corresponding to the one-time duration.

3. The noise masking apparatus of claim 2, wherein the controller is configured to set a reproduction time of the seed sound source corresponding to the one-time duration.

4. The noise masking apparatus of claim 3, wherein the controller is configured to set a one-time reproduction time of the masking sound to be longer than a reproduction time of the seed sound source.

5. The noise masking apparatus of claim 4, wherein the controller is configured to set the repeating reproduction time of the masking sound to be longer than the one-time reproduction time of the masking sound.

6. The noise masking apparatus of claim 5, wherein the controller is configured to set the total reproduction time of the masking sound to be longer than the repeating reproduction time of the masking sound.

7. The noise masking apparatus of claim 1, wherein the controller is configured to set a pitch change rate of the seed sound source using a sigmoid function.

8. The noise masking apparatus of claim 1, wherein the controller is configured to apply at least one of a low-pass filter, a high-pass filter, and a band-pass filter to exclude a specific frequency band from the seed sound source.

9. A noise masking method comprising:

receiving an impact sound;

generating a seed sound source based on an impact noise when the received impact sound is determined as the impact noise;

modulating the seed sound source to generate a masking sound;

reproducing the masking sound;

setting a repeating reproduction time of the masking sound and reproducing the masking sound during the repeating reproduction time; and setting a total reproduction time of the masking sound and reproducing the masking sound during the total reproduction time.

10. The noise masking method of claim 9, wherein the generating of the seed sound source includes:

calculating a one-time duration and a generation period of the impact noise, selecting a base sound source to interwork with the impact noise, and generating the seed sound source by linking the selected base sound source with impact noise data corresponding to the one-time duration.

11. The noise masking method of claim 10, wherein a reproduction time of the seed sound source is set corresponding to the one-time duration.

12. The noise masking method of claim 11, wherein the generating of the masking sound includes:

setting a one-time reproduction time of the masking sound to be longer than a reproduction time of the seed sound source.

13. The noise masking method of claim 12, wherein the repeating reproduction time of the masking sound is set to be longer than the one-time reproduction time of the masking sound.

14. The noise masking method of claim 13, wherein the total reproduction time of the masking sound is set to be longer than the repeating reproduction time of the masking sound.

15. The noise masking method of claim 9, wherein the generating of the masking sound includes:

setting a pitch change rate of the seed sound source using a sigmoid function.

16. The noise masking method of claim 9, wherein the generating of the masking sound includes:

applying at least one of a low-pass filter, a high-pass filter, and a band-pass filter to exclude a specific frequency band from the seed sound source.

* * * * *